United States Patent Office 3,636,139
Patented Jan. 18, 1972

3,636,139
POLY(VINYL CHLORIDE)
Norman G. Gaylord, New Providence, and Akio Takahashi, Parsippany, N.J., assignors to Gaylord Associates Inc., Newark, N.J.
No Drawing. Filed Mar. 11, 1968, Ser. No. 711,850
Int. Cl. C08f 29/24, 15/02
U.S. Cl. 260—876 R         17 Claims

ABSTRACT OF THE DISCLOSURE

Poly(vinyl chloride) of improved thermal stability is prepared by contacting vinyl chloride homopolymer with a 1,4-polybutadiene having a cis-1,4 content of at least 35%.

---

The utilization of vinyl chloride polymers is directly related to their processibility. In order to obtain an adequately low melt viscosity for improved processibility without reducing the molecular weight, it is necessary to either incorporate an external plasticizer or polymeric additive, utilize a comonomer in the polymerization and/or process at elevated temperatures. The use of an external plasticizer leads to a flexible thermoplastic while copolymerization or the use of additives lead to flexible or rigid polymers depending upon the concentration of comonomer or additive. In either case, the second order or glass transition temperature is generally decreased.

Increasing the processing temperature is an obvious method for decreasing the melt viscosity, making possible high speed fabrication, including injection molding, extrusion and blow molding, of rigid poly(vinyl chloride). However, at elevated temperatures the polymer has poor thermal stability as manifested by discoloration and a loss of properties. The degradation noted upon the exposure of poly(vinyl chloride) to elevated processing temperatures results from thermal and thermo-oxidative dehydrochlorination. Consequently, stabilizers are incorporated into the polymer in order to retard or delay the initiation or propagation of dehydrochlorination as well as to scavenge or react with the evolved hydrogen chloride. The stabilizers commonly used include metal compounds, such as lead, barium, cadmium, tin, calcium and zinc compounds, as well as epoxides and organic phosphorus compounds. The disadvantage of such added stabilizers include their potential toxicity, color, incompatibility, extractability, migration and cost.

It is an objective of the present invention to provide a poly(vinyl chloride) which may be processed at elevated temperatures with a greatly reduced tendency to discolor and degrade.

A still further objective of the present invention is to provide a rigid poly(vinyl chloride) which is suitable for high speed fabrication as in injection molding, extrusion and blow molding.

Another objective of the present invention is to provide processes for the preparation of poly(vinyl chloride) with improved thermal stability.

It has now been discovered that the reaction of poly(vinyl chloride) with a high cis-1,4-polybutadiene in the presence of a dialkylaluminum halide yields a poly(vinyl chloride) with improved thermal stability, as demonstrated by the almost total absence of discoloration on molding into a film at 200° C. in air. The improved thermal stability is also evidenced by the reduced rate of dehydrochlorination on heating in an inert atmosphere at 180° C., and higher onset and peak temperatures for hydrogen chloride evolution as determined by differential thermal analysis.

The high cis-1,4-polybutadiene utilized in the modification of the poly(vinyl chloride) may be prepared by any of the well known processes including polymerization of butadiene using catalyst systems based on aluminum alkyl-titanium tetraiodide, dialkyl aluminum chloride/cobalt compound, aluminum alkyl/cobalt compound/organic halide, lithium metal, organolithium compounds, etc. Although poly(vinyl chloride) with improved thermal stability may be prepared by reaction with polybutadiene with a cis-1,4 content of at least 35%, the greatest improvement is obtained with a polybutadiene with a cis-1,4 content of at least 75%, preferably greater than 90%.

When commercially available polybutadienes are utilized, it is generally necessary to remove the antioxidants and other stabilizers which are usually incorporated to improve storage stability. This may be accomplished by conventional methods, e.g. by dissolving the polymer in benzene or chlorobenzene and precipitating in methanol or washing the polymer solution with aqueous alkali, if the stabilizer is a phenolic compound, or with aqueous acid, if the stabilizer is an amine derivative. If the stabilizer is removed by the aqueous washing technique, it is necessary to remove residual water from the polymer solution by drying over suitable desiccants such as lithium aluminum hydride, calcium hydride, etc.

The catalyst for the reaction between poly(vinyl chloride) and the high cis-1,4-polybutadiene is a dialkylaluminum halide or sesquihalide, e.g. diethylaluminum chloride. The catalyst may be added from an external source or may be generated in situ, e.g. by the reaction of an aluminum alkyl with either titanium tetrachloride or a reactive organic halide such as benzyl chloride or tertbutyl chloride.

The catalyst concentration, e.g. the concentration of diethyl aluminum chloride, may vary from 0.2–5% by weight based on the poly(vinyl chloride), although the preferred concentration is between 0.5 and 1.5 weight percent.

Although thermally stable poly(vinyl chloride) is obtained by the reaction of cis-1,4-polybutadiene with poly(vinyl chloride) in the presence of diethylaluminum chloride alone, the addition of 0.001–0.1 mole of a cobalt compound per mole of the diethylaluminum chloride yields a gel-free product with even better properties. The preferred cobalt compound concentration is between 0.002 and 0.01 mole per mole of aluminum compound.

The cobalt compound may be a cobalt halide complex, a cobalt salt of an organic acid containing 2–40 carbon atoms or a cobalt chelate of a compound containing oxygen, nitrogen or sulfur. Typical cobalt compounds include the pyridine and alkanol complexes of cobalt chloride, cobalt octoate, cobalt stearate, cobalt naphthenate, cobalt acetylacetonate, cobalt benzoylacetonate, cobalt (II) bis-(salicylaldehyde), cobalt (II) bis(α-hydroxyacetophenone), cobalt (II) bis(5-hydroxy-1,4-naphthoquinone), cobalt (II) bis(o-vanillin), cobalt (II) bis-(quinizarine), cobalt (II) bis(8-hydroxyquinoline), cobalt (II) bis(salicylaldehydeimine), cobalt (II) bis(salicylaldehyde) ethylenediimine, cobalt (III) tris(dimethylglyoxime), cobalt (III) tris(α-nitroso-β-naphthol), cobalt (II) bis(mercaptobenzothiazole), cobalt (II) bis(mercaptobenzoxazole), cobalt (II) bis(mercaptobenzimidazole), cobalt (II) bis(ethyl exanthate), cobalt (II) bis(3-mercapto-1-pehnyl-2-butene-1-one) and cobalt (II) bis(3-mercapto-1,3-diphenyl-2-propene-1-one).

Although the reaction may be carried out homogeneously, it is preferred to utilize a heterogeneous system in order to control the extent of reaction and simplify the procedure for isolating the reaction product. The reaction is consequently carried out under conditions such that the reaction medium is a solvent for the cis-1,4-polybutadiene but only suspends or swells the poly(vinyl chloride).

Halogenated aromatic hydrocarbons such as monochlorobenzene, dichlorozene, chlorinated toluenes and other halogen substituted aromatic hydrocarbons which are liquid under the reaction conditions, i.e. at temperatures of −10 to +30° C., are the preferred solvents. The halogenated aromatic hydrocarbons may be mixed with up to 75% by volume of other solvents such as aliphatic or aromatic hydrocarbons or halogenated aliphatic or aromatic hydrocarbons which are liquids and inert towards poly(vinyl chloride) as well as aluminum alkyls and alkyl aluminum halides under the reaction conditions employed.

The total quantity of solvent used may be varied over a wide range of concentrations. A five to twenty fold volume excess of solvent by weight of poly(vinyl chloride) is a convenient concentration.

The reaction is carried out using up to 10% by weight of polybutadiene based on the poly(vinyl chloride). However, in order to avoid changing properties of the poly(vinyl chloride) other than the thermal stability, the preferred extent of reaction is 3–6%.

The reaction temperature may be varied from below 0 to +40° C. However, it is preferred to carry out the reaction with polybutadiene at 5–10° C. The reaction time at the lower temperature is approximately 1–2 hours. At higher temperatures the reaction may be completed in 15 minutes. However, the faster reaction time requires extreme caution and temperature control to avoid degradation of the poly(vinyl chloride) or gelation.

The reaction of the polybutadiene with the poly(vinyl chloride) is approximately 60–80% complete in 1 hour at 5–10° C. Although the reaction is usually carried to completion, it is often desirable to terminate the reaction at this point by addition of methanol. In this manner a 5% charge of polybutadiene results in a 3–4% add-on while a 10% charge results in a 6–8% reaction. The unreacted polybutadiene may be extracted with hexane or other suitable solvent. However, it is normally not necessary to remove the unreacted polybutadiene which is compatibilized by the poly(vinyl chloride)-polybutadiene reaction product.

A convenient method for carrying out the reaction of a high cis-1,4-polybutadiene with poly(vinyl chloride) is to polymerize butadiene using a suitable catalyst system, for example, diethylaluminum chloride/cobalt stearate/ tert-butyl chloride or triethylaluminum/cobalt chelate/ benzyl chloride, and then add an appropriate quantity of the resultant polybutadiene solution to a suspension of poly(vinyl chloride) in chlorobenzene. Additional diethylaluminum chloride may then be added to the reaction mixture, although this is unnecessary if the initial concentration is adequate.

A greatly simplified procedure involves the polymerization of butadiene in the presence of a suspension of poly(vinyl chloride) in chlorobenzene. In this case, the poly(vinyl chloride suspension is cooled to 5–10° C., diethylaluminum chloride is added, followed by butadiene and a cobalt compound. The butadiene concentration is 3–10% by weight based on the poly(vinyl chloride), the diethylaluminum chloride concentration is 0.3–5% by weight based on the poly(vinyl chloride) and the cobalt compound concentration is 0.001–0.1 mole per mole of the diethylaluminum chloride, preferably 0.002–0.01 mole.

The cobalt compound may be a cobalt halide complex, a cobalt salt of an organic acid containing 2–40 carbon atoms or a cobalt chelate of a compound containing oxygen, nitrogen or sulfur. Typical cobalt compounds include the pyridine and alkanol complexes of cobalt chloride, cobalt octoate, cobalt stearate, cobalt naphthenate, cobalt acetylacetonate, cobalt benzoylacetonate, cobalt (I) bis-(salicylaldehyde), cobalt (II) bis(α-hydroxyacetophenone), cobalt (II) bis(5 - hydroxy - 1,4 - naphthoquinone), cobalt (II) bis(o-vanillin), cobalt (II) bisquinizarine), cobalt (II) bis(8-hydroxyquinoline), cobalt (II) bis(salicylaldeimine), cobalt (II) bis(salicylaldehyde) ethylenediimine, cobalt (III) tris(dimethylglyoxime), cobalt (III) tris(α-nitroso-β-naphthol), cobalt (II) bis(mercaptobenzothiazole), cobalt (II) bismercaptobenzoxazole), cobalt (II) bis(mercaptobenzimidazole), cobalt (II) bis(ethyl xanthate), cobalt (II) bis(3-mercapto-1-phenyl-2-butene-1-one) and cobalt (II) bis(3-mercapto-1,3-diphenyl-2-propane-1-one).

The reaction mixtures from either the reaction of poly(vinyl chloride) with a high cis-1,4-polybutadiene in the presence of a dialkylaluminum halide or from the polymerization of butadiene in the presence of poly(vinyl chloride) using a catalyst system containing or generating an aluminum alkyl or dialkylaluminum halide, are diluted by the addition of a diluent which is a nonsolvent for poly(vinyl chloride). Suitable diluents include aliphatic or aromatic hydrocarbons such as hexane, heptane or benzene, or compounds containing an active hydrogen atom such as acetic acid or a lower alkanol such as methanol or ethanol. Methanol is the preferred diluent by virtue of its miscibility with the preferred reaction medium chlorobenzene, its ability to readily react with and deactivate an aluminum alkyl or alkyl aluminum halide, and its low boiling point and water solubility.

Under the experimental conditions and concentrations employed in the present invention, the addition of diethylaluminum chloride to a chlorobenzene solution of high cis-1,4-polybutadiene, followed by precipitation with methanol, results in no reduction in the complete hexane or tetrahydrofuran solubility of the polybutadiene. However, when poly(vinyl chloride) is present during the addition of diethylaluminum chloride to the cis-1,4-polybutadiene, under the same conditions, only 0–40% of the polybutadiene is extractable by the hexane, the amount depending upon the reaction time. When the hexane-isoluble residue is extracted with tetrahydrofuran, greater than 90% dissolves. The soluble material is identifiable as unmodified poly(vinyl chloride) while the hexane-insoluble, tetrahydrofuran-insoluble residue is shown by elemental analysis to contain hydrocarbon residues, i.e. it is a reaction product of poly(vinyl chloride) and cis-1,4-polybutadiene. When the initially added cis-1,4-polybutadiene is of low molecular weight, the precipitated product from the reaction with poly(vinyl chloride) in the presence of diethylaluminum chloride, yields a hexane-insoluble residue which is essentially completely soluble in tetrahydrofuran and contains hydrocarbon residues.

When a solution of cis-1,4-polybutadiene is prepared directly by polymerizing butadiene with a catalyst system which contains sufficient diethylaluminum chloride, either per se or as a result of in situ generation, and the solution is then added to a suspension of poly(vinyl chloride) in chlorobenzene, precipitation with methanol after a suitable reaction period, results in a reaction product which has little or no solubility in refluxing hexane. The soluble fraction, when obtainable, is identifiable as a high molecular weight polybutadiene with a cis-1,4-content of greater than 90%. When the initial polybutadiene solution is precipitated with methanol without reaction with poly(vinyl chloride), the isolated polymer is soluble in hexane and is identifiable as the same high molecular weight polybutadiene with a greater than 90% cis-1,4 content.

When butadiene is polymerized in the presence of a suspension of poly(vinyl chloride) in chlorobenzene using a catalyst system based on diethylaluminum chloride, the methanol precipitated reaction product has little or no solubility in refluxing hexane. The soluble fraction, when obtainable, is identifiable as a greater than 90% cis-1,4-polybutadiene. In this case, the hexane-insoluble residue is essentially completely soluble in tetrahydrofuran, probably due to the low molecular weight of the polybutadiene in the poly(vinyl chloride)-cis-1,4-polybutadiene reaction product.

Although it is difficult to detect structural characteristics other than those of poly(vinyl cholride) in a polybutadiene-poly(vinyl chloride) reaction product containing less than 5% polybutadiene, products containing 5–10% polybutadiene can be shown to contain cis-1,4-unsaturation by infrared spectroscopic analysis.

It thus appears that the products obtained by the present invention by either polymerizing butadiene in the presence of poly(vinyl chloride) or by reacting high cis-1,4-polybutadiene with poly(vinyl chloride), in either case utilizing a catalyst containing a dialkylaluminum chloride, have the same composition, that is, they are graft copolymers of poly(vinyl chloride) and high cis-1,4-polybutadiene mixed with unmodified poly(vinyl chloride).

When poly(vinyl chloride), free of plasticizer or stabilizer, is compression molded in air at 200° C. under adequate pressure, e.g. 500–600 p.s.i., thermal degradation results in discoloration to a pink to brown colored film. When the modified poly(vinyl chloride) of the present invention, containing as little as 3% of the reaction product with cis-1,4-polybutadiene, is pressed under the same conditions, the resultant film is essentially colorless or no more than faintly discolored.

Since discoloration is related to dehydrochlorination and is generally considered to result from the development of sequences of conjugated unsaturation of suffcient length to absorb in the visible region of the spectrum, that is, a minimum of five to sevent double bonds, substitution on the poly(vinyl chloride) chain would prevent the development of long polyene sequences and reduce discoloration. However, dehydrochlorination resulting in numerous short polyene sequences is not necessarily materially reduced, and the polymer becomes embrittled as a result of chain scission and crosslinking, although only slightly discolored.

Consequently, reduced or retarded hydrogen chloride evolution is a more reliable measure of the thermal stability of poly(vinyl chloride). When the unmodified polymer is pressed to a film in air at 200° C. on a black iron or untreated steel plate, the pressed film is deeply colored and the metal surface beneath the polymer film is corroded and becomes covered with a film of rust. In contrast, under the same conditions, the pressed film from the modified polymer of the present invention is very slightly discolored and the metal surface remains free of corrosion and rust even after several months exposure to the atmosphere.

It is thus apparent that the thermal stabilization of the poly(vinyl chloride) which results from a heterogeneous grafting of as little as 3–5% cis-1,4-polybutadiene results from more than a simple substitution and indicates a synergistic interaction. This is further demonstrated by dissolving up to 10% cis-1,4-polybutadiene in a chlorobenzene suspension or solution of poly(vinyl chloride) and isolating the polymer blend by precipitation with methanol. Films pressed from the polymer blend are generally deeply colored and contain incompatible, probably gelled or cross-linked, areas.

In order to improve the thermal stability of poly(vinyl chloride), it is common practice to add metal compounds, generally metalloorganic compounds, in concentrations of 1–5 parts per 100 parts of poly(vinyl chloride). Although the modified poly(vinyl chloride) of the present invention, in the absence of an added stabilizer, yields, essentially colorless or only faintly discolored films, completely colorless films are obtained when the conventional stabilizers are added in concentrations of 0.1–0.3 part per 100 parts of modified poly(vinyl chloride). Actualy, the use of the conventional stabilizers in the usual concentrations of 1–5 parts per 100 parts of modified poly(vinyl chloride) is sometimes detrimental and results in greater color development than in the absence of stabilizer.

A further indication of the enhanced thermal stabilization inherent in the modified polymer is the reduction in the concentration of conventional stabilizer required to prevent discoloration of an unmodified poly(vinyl chloride), when the latter is blended with the graft copolymer or the mixture of graft copolymer and unmodified poly(vinyl chloride) resulting from the heterogeneous grafting reaction.

Two additional tests for thermal stability as measured by hydrogen chloride evolution demonstrate the improved stability of the modified poly(vinyl chloride).

The first test is a modification of ASTM Method D793–49 (1965) which describes a procedure for determining the short-time stabiilty at elevated temperatures of plastics containing chlorine. Utilizing the apparatus described in the ASTM method, 10 g. of polymer is heated at 180° C. in a flask immersed in an oil bath and preheated nitrogen is passed slowly over the sample. Under these conditions the sample slowly evolves hydrogen chloride which is carried by the nitrogen and bubbled into 70 ml. of distilled water. The pH of the solution is continuously measured with a pH meter and converted to millimoles of HCl, by means of a calibration curve constructed by adding known quantites of HCl to 70 ml. of distilled water. Further calibration is carried out by bubbling the evolved HCl into a dilute sodium hydroxide solution and back titrating with dilute hydrochloric acid.

The results are plotted as millimoles of hydrogen chloride evolved as a function of time and the shape of the curve, and the time required for the evolution of HCl representing 0.1 mole percent (0.058 weight percent) decomposition of the poly(vinyl chloride) are noted.

The curve obtained with poly(vinyl chloride) prepared by suspension polymerization generally indicates autocatalytic thermal dehydrochlorination and the time required for 0.1 mole percent decomposition is usually less than 35 minutes. When the poly(vinyl chloride) is obtained by bulk polymerization the dehydrochlorination plot is generally linear, shows little autocatalytic character, and the time for 0.1 mole percent decomposition is approximately 40 minutes.

When the product of the reaction of poly(vinyl chloride) with cis-1,4-polybutadiene is subjected to the HCl evolution test, irrespective of whether the base poly(vinyl chloride) is prepared by suspension or bulk polymerization techniques, the curve is essentially linear and the time for 0.1 mole percent decomposition is generally more than 50 minutes and often as much as 100 minutes.

Differential thermal analysis is utilized as a further measure of thermal stability. Samples are heated at the rate of 10° C./minute from 25–500° C. in a nitrogen atmosphere. The peak of the endothermic reaction resulting on decomposition of the polymer samples is a measure of the degradation, e.g. dehydrochlorination, of the poly(vinyl chloride). Similarly, the onset of decomposition is indicated by the temperature at which the trace or plot leaves the baseline.

Whereas the onset of decomposition, under the condition described above, for unmodified poly(vinyl chloride) is observed at approximately 240–260° C. and the peak decomposition temperature is approximately 275–280° C., the modified poly(vinyl chloride) prepared from the same unmodified base polymer shows the onset of decomposition at approximately 260–270° C. and a peak decomposition temperature of 290–325° C.

Whereas the addition of a stabilizer may retard the initial rate of dehydrochlorination sufficiently to yield a colorless or faintly discolored film at 200° C., the results of the differential thermal analysis and the hydrogen chloride evolution test are unchanged. Thus, the addition of 0.5 part cadmium stearate per 100 parts of unmodified bulk polymerized poly(vinyl chloride) results in a composition which yields an essentially colorless film at 200° C. However, the hydrogen chloride evolution test at 180° C. indicates 0.1 mole percent decomposition after 40 minutes, unchanged from the value for the unstabilized polymer. Similarly, the differential thermal analysis shows an unchanged $T_g$ of 81° C., onset of decomposition at 245° C. and a peak decomposition temperature of 280° C.

The invention will be more fully understood by references to the following illustrative embodiments.

EXAMPLE 1

Unmodified poly(vinyl chloride)

(A) Compression molding at 200° C. in air.—Poly- (vinyl chloride), prepared by suspension polymerization, in the absence of plasticizer or stabilizer, is compression molded in air by preheating the powdered sample at 200° C. for one minute, followed by pressing at 200° C. for one minute under 6000 p.s.i. pressure. The resultant disk has a red to brown color.

When poly(vinyl chloride) prepared by bulk polymerization, is pressed under the same conditions, the resultant disk is only slightly less colored.

(B) Dehydrochlorination at 180° C.—The rate of dehydrochlorination is determined by a modification of ASTM Method D793–49 (1965).

The time for evolution of hydrogen chloride corresponding to 0.1 mole percent decomposition of a 10 g. sample of poly(vinyl chloride) prepared by suspension polymerization is 30–35 minutes. Poly(vinyl chloride) prepared by bulk polymerization gives a value of 40–45 minutes for 0.1 mole percent decomposition.

(C) Differential thermal analysis.—A sample of film pressed at 200° C. in air, as described in Example 1A, is subjected to differential thermal analysis while the sample is heated at a rate of 10° C. per minute from 25–500° C. in a nitrogen atmosphere.

A sample of poly(vinyl chloride) prepared by suspension polymerization has a second order transition temperature ($T_g$) of 82° C., the onset of decomposition occurs at 247° C., while the endothermic peak decomposition temperature is noted at 276° C.

A sample of poly(vinyl chloride) prepared by bulk polymerization has a $T_g$ of 84° C., the onset of decomposition occurs at 245° C. and the peak decomposition temperaure is noted at 278° C.

EXAMPLE 2

Chlorobenzene, 600 ml., and 40 g. of poly(vinyl chloride), prepared by suspension polymerization, were placed in a 3-necked flask equipped with a reflux condenser, Teflon coated magnetic bar, thermometer, and gas inlet and outlet. Nitrogen was bubbled through the poly(vinyl chloride) suspension which was then cooled to 5–8° C. Diethylaluminum chloride, 12 mmoles, was added and stirring was continued for 7 minutes. After the addition of 4 g. of butadiene and 11 mg. (0.06 mmole) of cobalt (II) bis(salicylaldehyde imine), the heterogeneous reaction mixture was stirred for an additional 60 minutes at 5–8° C. The mixture was poured into a large amount of methanol and the white, powdery product was filtered, washed with methanol and dried at 40–50° C. in a vacuum oven to constant weight. The product weighing 43.3 g. was extracted with n-hexane under reflux for 24 hours. The hexane-soluble part constituted 3.7% of the reaction product and analyzed for 1.31% chlorine. Infrared spectral analysis of the soluble fraction revealed that it was a high cis-1,4-polybutadiene containing 90.3% cis-1,4, 6.2% trans-1,4 and 3.5% 1,2-vinyl structural units, calculated using the absorption coefficient of D. Morero, A. Santambrogio, L. Porri and F. Ciampelli as published in La Chimica e l'Industria (Milan), vol. 41, p. 758 (1959). The intrinsic viscosity of the cis-1,4-polybutadiene, measured at 25° C. in benzene was 0.2.

The hexane insoluble mixture of poly(vinyl chloride) and the graft copolymer of poly(vinyl chloride) and cis-1,4-polybutadiene was pressed at 200° C. into an essentially colorless film. The time for the evolution of hydrogen chloride at 180° C. corresponding to 0.1 mole percent decomposition was 50 minutes. The differential thermal analysis indicted a $T_g$ of 80° C., the onset of decomposition at 270° C. and the peak decomposition temperature at 305° C. The torque rheometer test indicated a stability of 5 minutes.

EXAMPLE 3

Treatment of 20 g. of poly(vinyl chloride) prepared by suspension polymerization, which had been suspended in 300 ml. of chlorobenzene, at 5° C. with 2 g. of butadiene, 6 mmoles of diethyl aluminum chloride and 18.7 mg. (0.03 mmole) of cobalt stearate, under the same conditions as in Example 2, gave 21.5 g. of reaction product. Extraction with refluxing n-hexane for 24 hours permitted the separation of 97.8% of an insoluble fraction.

The insoluble reaction product gave a colorless film at 200° C. and the evolution of hydrogen chloride corresponding to 0.1 mole percent decomposition at 180° C. required 55 minutes.

EXAMPLE 4

Substitution of 0.03 mmole of the cobalt chloride-pyridine complex for the cobalt stearate in Example 3 gave 21.7 g. of reaction product which could be pressed into a film of excellent color. Extraction of the reaction product with refluxing hexane resulted in the dissolution of less than 1% of the material.

EXAMPLE 5

Suspension polymerized poly(vinyl chloride), 20 g., was suspended in 190 ml. of chlorobenzene and the resultant slurry was cooled to 5° C. The addition of 2 g. of butadiene was followed by the successive addition of 0.01 mmole of cobalt (II) bis(salicylaldehyde imine), 2 mmoles of tertiary-butyl chloride and 2 mmoles of triethyl aluminum. The reaction mixture was stirred at 8° C. for 60 minutes and then poured into 1 liter of methanol. The vacuum dried product weighed 21.9 g., representing an add-on of 5.1%.

The film pressed at 200° C. was only faintly colored. The hydrogen chloride evolution test at 180° C. required 40 minutes for 0.1 mole percent decomposition. Differential thermal analysis gave a $T_g$ value of 77° C., the onset of decomposition occurred at 268° C. and the endothermic peak decomposition occurred at 300° C.

EXAMPLE 6

A mixture of 50 mg. (0.08 mmole) of cobalt stearate, 500 ml. of dried toluene, 0.11 ml. (1 mmole) of tertiary-butyl chloride and 54 g. of butadiene was cooled to 5–10° C. Nitrogen was bubbled through the solution followed by the addition of 10 mmoles of diethylaluminum chloride.

After two hours of stirring at 5–10° C., 10 ml. of the reaction mixture was removed and added to a slurry of 20 g. of suspension grade poly(vinyl chloride) in 190 ml. of chlorobenzene, which had been previously cooled to 5–10° C. and through which nitrogen was bubbled. After the addition of 3 mmoles of diethyl aluminum chloride the reaction mixture was stirrred for 60 minutes at 5–10° C. The reaction product, isolated after addition of methanol and dried in vacuo, weighed 20.8 g. and was completely insoluble in refluxing hexane.

A film pressed from the reaction product at 200° C. under 6000 p.s.i. pressure was colorless. The hydrogen chloride evolution corresponding to 0.1 mole percent decomposition at 180° C. required 65 minutes.

After the removal of the portion of the polymer solution for subsequent reaction with poly(vinyl chloride), the polymerization of butadiene in the original mixture was terminated by the addition of methanol. The isolated polybutadiene had a greater than 96% cis-1,4-structure and an intrinsic viscosity in benzene at 30° C. of 4.80.

EXAMPLE 7

Commercial cis-1,4-polybutadiene prepared with a diethyl aluminum chloride-cobalt compound-cocatalyst system was freed of antioxidant by solution in benzene and precipitation with methanol. The cis-1,4-polybutadiene had an intrinsic viscosity in benzene at 25° C. of 2.4 and a greater than 96% cis-1,4 content.

Two grams of the cis-1,4-polybutadiene were dissolved in 100 ml. of chlorobenzene. When all of the rubber was in solution, 20 g. of poly(vinyl chloride), prepared by suspension polymerization, was added and the slurry was stirred for 30 minutes while nitrogen was bubbled through the heterogeneous mixture. After the mixture was cooled to 5° C., 5.4 mg. (0.03 mmole) of cobaltous bis(salicylaldehyde imine) and 11.6 mmoles of diethylaluminum chloride were added. After 40 minutes, a small amount of methanol was added to stop the reaction and the mixture was precipitated into a large amount of methanol. The dried reaction product weighed 22.0 g. and, after extraction with refluxing hexane for 24 hours, the dried residue represented 98.2% of the product.

The modified poly(vinyl chloride) was pressed into a nearly colorless film at 200° C. Decomposition of the material at 180° C. under nitrogen evolved a quantity of hydrogen chloride corresponding to 0.1 mole percent decomposition after 58 minutes. Differential thermal analysis gave a $T_g$ of 80° C., the onset of decomposition was observed at 270° C. and the peak decomposition temperature was 310° C.

EXAMPLE 8

The reaction in Example 7 was repeated omitting the cobalt compound. The reaction product weighed 22.0 g. and was 99.3% hexane-insoluble. The film pressed at 200° C. was colorless, the hydrogen chloride evolution time corresponding to 0.1 mole percent decomposition at 180° C. was 50 minutes, the $T_g$ from differential thermal analysis was 74° C., the onset of degradation occurred at 265° C. and the peak decomposition temperature was 317° C.

EXAMPLE 9

The reaction in Example 8 was repeated substituting a commercial polybutadiene prepared with an organolithium catalyst for the cis-1,4-polybutadiene. The polybutadiene had an intrinsic viscosity of 1.7 in benzene at 25° C., a cis-1,4 content of approximately 35% and a trans-1,4 content of approximately 60%.

The reaction product was 99.5% insoluble in hexane and gave a film at 200° C. which had a slightly yellow cast as compared to the deep brown color of an unmodified poly(vinyl chloride) film pressed at the same temperature. The time for the evolution of hydrogen chloride at 180° C. corresponding to 0.1 mole percent decomposition was 40 minutes. The $T_g$ was 81° C., the onset of decomposition occurred at 273° C. and the peak decomposition temperature was 300° C.

EXAMPLE 10

Under the same conditions as in Example 8, 20 g. of suspension-grade poly(vinyl chloride) and 2 g. of cis-1,4-polybutadiene, prepared with an aluminum alkyl-titanium tetraiodide catalyst system (95% cis-1,4 content, intrinsic viscosity at 25° C. in benzene 2.2) in 200 ml. chlorobenzene were allowed to react in the presence of 2 mmoles of diethylaluminum chloride at 5–10° C. for a period of 60 minutes. The reaction product was isolated by precipitation in methanol and dried to yield 22.0 g. of modified poly(vinyl chloride). Hexane extraction under reflux for 24 hours removed 8% of hexane soluble material.

A film pressed at 200° C. without added stabilizer or plasticizer had a faintly pink, almost colorless appearance. The hydrogen chloride evolution time for 0.1 mole percent decomposition at 180° C. was 42.5 minutes, the $T_g$ was 84° C., the onset of decomposition occurred at 265° C. and the endothermic peak decomposition temperature was 301° C.

EXAMPLE 11

Into a 10 liter, round-bottomed, 3-necked reaction vessel equipped with mechanical stirrer, thermometer, gas inlet and outlet were added 60 g. of 96% cis-1,4-polybutadiene, intrinsic viscosity 2.4 in benzene at 25° C., prepared with a diethylaluminum chloride-cobalt compound catalyst system and 6000 ml. of dried monochlorobenzene. The mixture was stirred under a nitrogen atmosphere until the rubber was completely dissolved. At this point, 1.2 kg. of poly(vinyl chloride), prepared by bulk polymerization, was added to the rubber solution and nitrogen was bubbled through the mixture for 15 minutes to displace any entrapped air. The reaction mixture was cooled to 5–10° C. by the external application of ice water to the flask. At 7° C., under a nitrogen atmosphere, 6 g. (50 mmoles) of diethylaluminum chloride was added. Within 15 minutes after the catalyst was added, the reaction mixture became a light yellow color and the viscosity increased. After an additional 45 minutes under nitrogen at 5–10° C., 500 ml. of methanol was added. The reaction mixture was poured into a large volume of methanol, filtered, washed with methanol and dried in a vacuum oven at 40° C. to constant weight. The recovered reaction product weighed 1260 g.

A portion of the reaction product, 22.34 g., was extracted with hexane at room temperature for 12 hours and was separated into 22.04 g. of an insoluble fraction and 0.31 g. of a soluble fraction. The add-on in the original reaction was calculated to be 3.5%.

One gram of the hexane-insoluble reaction product was placed in a hydraulic press, preheated at 200° C. for 1 minute and then pressed at 200° C. for 1 minute under 6000 p.s.i. pressure to give a faintly yellow film.

A differential thermal analysis on the pressed film indicated a second order glass transition temperature of 76° C., the onset of decomposition at 270° C. and the endothermic peak of decomposition at 295° C. as compared to the corresponding values for the original unmodified poly(vinyl chloride) of 84° C., 245° C. and 278° C., respectively.

The time for the evolution of hydrogen chloride at 180° C. under nitrogen, corresponding to 0.1 mole percent decomposition was 61 minutes as compared with a value of 44.5 minutes for the unmodified poly(vinyl chloride).

EXAMPLE 12

Under the same conditions as in Example 8, 20 g. of suspension-grade poly(vinyl chloride) and 2 to g. of 1,4-polybutadiene (47.1% cis-1,4, 44.5% trans-1,4 and 8.4% 1,2-vinyl, molecular weight 170,000) in 200 ml. dichlorobenzene were allowed to react in the presence of 2 mmoles of diethylaluminum chloride at 7–13° C. for 60 minutes. After precipitation in methanol and drying the recovered product weighed 21.96 g. Extraction with n-hexane at room temperature for 20 hours indicated an add-on of 9.1%.

A film pressed at 200° C. for 1 minute was faintly yellow. The time for hydrogen chloride evolution at 180° C. corresponding to 0.1 mole percent decomposition was 50 minutes. The $T_g$ was 80° C., the onset of decomposition occurred at 265° C. and the peak decomposition temperature was 307° C.

The modified poly(vinyl chloride) prepared by the processes of the present invention may be compounded, fabricated and utilized in a manner similar to that applicable to unmodified poly(vinyl chloride). However, the greater thermal stability of the modified homopolymers permits the use of fabrication and processing methods as well as applications which require higher temperatures. Further, the ability to withstand elevated temperatures permits the use of lower stabilizer concentrations and avoids the need to use less desirable, that is, more expensive, toxic, incompatible, migrating or extractable, stabilizers.

The modified poly(vinyl chloride) may be compounded with plasticizers, lubricants, processing aids, surfactants, impact modifiers, pigments and fillers, as is generally the case with unmodified poly(vinyl chloride). Higher molecular weight resins, after modification, may be processed with lower quantities of these additives than usual since the higher temperatures needed to achieve processing viscosities can be readily utilized. In addition to the conventional chemical blowing agents, materials which generate gases at higher temperatures may be used to produce

What is claimed is:

1. A graft copolymer of poly(vinyl chloride) having an add-on of a polybutadiene having a cis-1,4 content of at least 35%.

2. The graft copolymer of claim 1 where said polybutadiene has a cis-1,4 content greater than 90%.

3. The graft copolymer of claim 1 where said polybutadiene has a greater than 80% 1,4 structure.

4. A composition of matter comprising 90–99% of poly(vinyl chloride) and 1–10% of a graft copolymer of poly(vinyl chloride) having an add-on of a polybutadiene having a cis-1,4 content between 35% and 100%.

5. The composition of claim 4 where said polybutadiene has a greater than 90% cis-1,4 content.

6. The composition of claim 4 wherein the onset of thermal decomposition occurs above 260° C. and the peak decomposition temperature is at least 290° C.

7. The process which comprises reacting poly(vinyl chloride) with up to 10% by weight, based on the poly(vinyl chloride), of a polybutadiene having a cis-1,4 content of at least 35% in the presence of 0.2–5.0 weight percent of a dialkylaluminum halide and 0–0.1 mole of a cobalt compound per mole of dialkylaluminum halide, wherein said cobalt compound is selected from the group consisting of (a) a cobalt halide, (b) a cobalt halide-pyridine complex, (c) a cobalt halide-alkanol complex, (d) a cobalt salt of an organic acid containing 2–40 carbon atoms, and (e) a cobalt chelate of a compound containing oxygen, nitrogen or sulfur.

8. The process of claim 7 wherein the polybutadiene has a cis-1,4 content greater than 90%.

9. The process of claim 7 wherein the dialkylaluminum halide is diethylaluminum chloride.

10. The process of claim 7 wherein the poly(vinyl chloride) is suspended in an inert solvent containing 25–100% halogenated aromatic hydrocarbons.

11. The process of claim 10 wherein the halogenated aromatic hydrocarbon is chlorobenzene.

12. The process of claim 7 wherein the reaction product is isolated after treatment with methanol.

13. The process which comprises contacting butadiene with poly(vinyl chloride), said butadiene being present in a concentration of up to 10% by weight based on the poly(vinyl chloride), in the presence of 0.3–5.0 weight percent of dialkylaluminum halide and 0.001–0.1 mole of a cobalt compound per mole of dialkylaluminum halide, wherein the cobalt compound is selected from the group consisting of (a) a cobalt halide, (b) a cobalt halide-pyridine complex, (c) a cobalt halide-alkanol complex, (d) a cobalt salt of an organic acid containing 2–40 carbon atoms, and (e) a cobalt chelate of a compound containing oxygen, nitrogen or sulfur.

14. The process of claim 13 wherein the poly(vinyl chloride) is suspended in an inert solvent containing 50–100% halogenated aromatic hydrocarbons.

15. The process of claim 13 wherein the halogenated aromatic hydrocarbon is chlorobenzene.

16. The process of claim 13 wherein the dialkylaluminum halide is diethylaluminum chloride.

17. The process of claim 13 wherein the reaction product is isolated after treatment with methanol.

References Cited

UNITED STATES PATENTS

| 3,399,155 | 8/1968 | Baer et al. | 260—890 |
| 3,439,064 | 4/1969 | Makowski et al. | 260—879 |
| 3,476,830 | 11/1969 | Naarmann et al. | 260—879 |

FOREIGN PATENTS

| 817,684 | 8/1959 | Great Britain | 260—879 |
| 897,341 | 5/1962 | Great Britain | 260—879 |
| 899,029 | 6/1962 | Great Britain | 260—879 |
| 992,210 | 5/1965 | Great Britain | 260—94.7 |
| 1,309,809 | 10/1962 | France. | |
| 42/25,301 | 12/1967 | Japan. | |

OTHER REFERENCES

Engel et al., "Molecular Weight Jump Reaction," Rubber Age, December 1964, pp. 410–415.

MURRAY TILLMAN, Primary Examiner

H. W. ROBERTS, Assistant Examiner

U.S. Cl. X.R.

260—33.8 UA, 94.3, 879, 890